United States Patent [19]
Kuwahara et al.

[11] Patent Number: 5,585,718
[45] Date of Patent: Dec. 17, 1996

[54] DEVICE FOR DETECTING THE BENDING MAGNITUDE OF A SHAFT

[75] Inventors: Okikazu Kuwahara; Hideki Omori, both of Narashino, Japan

[73] Assignee: Seiko Seiki Kabushiki Kaisha, Japan

[21] Appl. No.: 188,077

[22] Filed: Jan. 27, 1994

[30] Foreign Application Priority Data

Feb. 5, 1993 [JP] Japan .................................. 5-018879

[51] Int. Cl.$^6$ .............................. G01B 7/14; G01N 27/72
[52] U.S. Cl. ....................................... 324/207.19; 324/236
[58] Field of Search ........................ 324/207.13, 207.14, 324/207.15, 207.16, 207.18, 207.19, 209, 228, 236, 234, 238, 207.25, 207.26, 225, 207.12; 73/861.331, 861.332

[56] References Cited

U.S. PATENT DOCUMENTS

| | | | |
|---|---|---|---|
| 4,053,849 | 10/1977 | Bower et al. | 324/207.19 |
| 4,752,732 | 6/1988 | Van Schoiack et al. | 324/236 |
| 4,791,367 | 12/1988 | Typpo | 324/236 |
| 5,018,071 | 5/1991 | Kihara et al. | 364/474.06 |
| 5,107,210 | 4/1992 | Shirao et al. | 324/207.26 |

FOREIGN PATENT DOCUMENTS

| | | |
|---|---|---|
| 0319265 | 6/1989 | European Pat. Off. . |
| 0465673 | 1/1992 | European Pat. Off. . |
| 3437374 | 4/1985 | Germany . |
| 0641732 | 8/1950 | United Kingdom . |
| 0666898 | 2/1952 | United Kingdom . |
| 0851745 | 10/1960 | United Kingdom . |

OTHER PUBLICATIONS

Database WPI, Week 8524, 25 Jul. 1985 Derwent Publications Ltd., London, GB, AN 85–145713/24.

Primary Examiner—Sandra L. O'Shea
Assistant Examiner—Roger Phillips
Attorney, Agent, or Firm—Adams & Wilks

[57] ABSTRACT

A device for detecting a bending magnitude of a rotary shaft comprises a first pair of coils spaced from and facing the outer surface of a shaft and having an inductance value, and a second pair of coils spaced from and facing the outer surface of the shaft and connected in series to the first pair of coils at respective nodal points. The second pair of coils has an inductance value different from the inductance value of the first pair of coils. A pair of high frequency oscillators applies a high frequency voltage across the first and second pairs of coils to generate at each of the nodal points an output signal corresponding to a bending magnitude of the shaft, each output signal having a constant linearity characteristic resulting from the difference in inductance value between the first and second pairs of coils. An amplifier is connected to each of the nodal points for amplifying the output signals from the nodal points. A synchronizing signal generator generates a synchronization signal, and a synchronizing detector is connected to each amplifier for detecting the amplified output signal from the amplifier based on the synchronization signal. A low-pass filter is connected to each of the synchronizing detectors for cutting a high frequency component from the output signal detected by the synchronizing detector and producing an output signal having a constant linearity characteristic.

16 Claims, 5 Drawing Sheets

DEVICE FOR DETECTING THE BENDING MAGNITUDE OF A SHAFT

BACKGROUND OF THE INVENTION

This invention relates to a device for detecting the amount of bend in a shaft such as a grindstone shaft, and particularly to a device which can detect the bending magnitude in a shaft with high precision.

Hitherto, in order to find such quantities as the grinding resistance acting on a shaft on the end of which a grindstone is fitted, or a so-called grindstone shaft, a device which detects the bending magnitude of the shaft has been used. This kind of device has a target integrally mounted in the outer surface of the shaft and first and second coils connected to each other in series, and the target comprises a laminated electromagnetic steel plate. The first coil is mounted close to the outer surface of the shaft and facing the target, and the second coil is disposed in such a way that it faces the first coil through the target and the shaft. These coils are formed in such a way that they both have substantially the same inductance.

This bending magnitude detecting device is constructed in such a way that when the shaft bends while a high frequency voltage is being applied across the first and second coils, it can detect the actual bending magnitude of the shaft by wave-detecting and rectifying an output signal which is produced at the series connection point of the two coils and whose absolute value corresponds to the bending magnitude of the shaft.

Figure 6A:
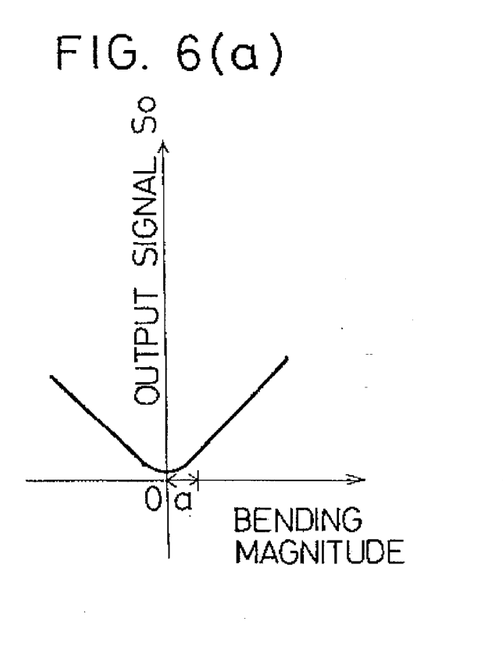
FIGS. 6a and 6b are views illustrating the characteristics of the output signals in a conventional bending magnitude detecting device.
Figure 6B:
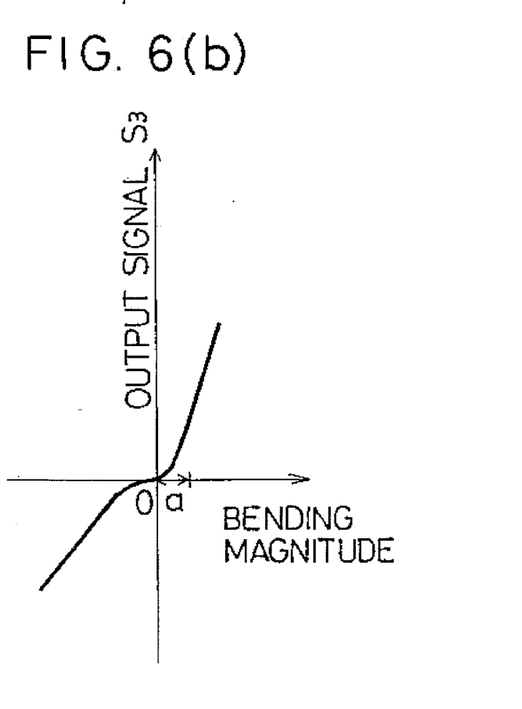

However, in this kind of conventional bending magnitude detecting device, i.e. in devices which use two coils to detect the bending magnitude of a shaft, even when a target of laminated electromagnetic steel plate is mounted integrally with the shaft as described above, due to hysteresis loss and eddy current loss caused by the high frequency excitation voltage, etc., especially when the bending range of the shaft is located in the vicinity of the center of both the coils and the bending magnitude is extremely small, the occurrence of a residual voltage in the coils is unavoidable. Because it is impossible to completely eliminate this residual voltage, in the characteristic of the output signal obtained from the series connection point of the two coils, as shown in FIG. 6(a), in the range [a] where the bending magnitude is extremely small, there is no linearity. In the characteristic of the wave-detected output signal obtained when this output signal is wave-detected and rectified, as shown in FIG. 6(b), in the range [a] where the bending magnitude is extremely small, changes in the magnitude of the wave-detected output signal are much smaller than changes in the magnitude of the bending. In other words, because the precision of the wave-detected output signal becomes coarse, it is impossible to detect the bending magnitude with high precision. Furthermore, because a laminated electromagnetic steel plate target for detecting the bending magnitude is incorporated into the shaft as an extra component, such problems as the added weight on the shaft increasing and the bending resonance frequency of the shaft falling, and, in order to prevent the target material being destroyed by centrifugal force, it not being possible to rotate the shaft at high speeds, have arisen.

When, in order to make it possible for the shaft to rotate at high speeds, the laminated electromagnetic steel plate target is removed. In other words when the shaft itself (integrated material of quenched steel) is made the target, there has been the problem that because, compared with the case in which the laminated electromagnetic steel plate target is provided, hysteresis loss and eddy current loss caused by the high frequency excitation voltage, etc., become even greater, and the residual voltage mentioned above becomes very large, the bending magnitude detection precision becomes much worse.

SUMMARY OF THE INVENTION

Accordingly, an object of this invention is to provide a bending magnitude detecting device which detects the bending magnitude of a shaft with high precision and which also makes possible the high speed rotation of the shaft.

In order to achieve this object, according to the present invention, a bending magnitude detecting device comprises: a first coil, mounted close to the outer surface of the shaft; a second coil, connected in series with the first coil and positioned in such a way that it faces the first coil through the shaft; voltage applying means for applying a high frequency voltage across both the coils; and a bending magnitude detecting section for detecting the magnitude of the bend in the shaft based on an output signal from the series connection point of the two coils; a difference is provided between the inductances of the two coils.

According to this invention, due to the difference in the inductances of the two coils, the output signal obtained from the series connection point of the two coils is offset in one direction; that is, even if the shaft bending magnitude is in the extremely small range, constant linearity can be obtained in the characteristic of the output signal mentioned above at all times.

DETAILED DESCRIPTION OF THE PREFERRED EMBODIMENTS

A preferred embodiment of a bending magnitude detecting device according to the present invention will now be described in detail, with reference to FIGS. 1 to 6. In this preferred embodiment, an example of the invention applied to a device which detects the bending magnitude of a shaft on the end of which a grindstone is fitted, or a so-called grindstone shaft, in order to obtain the grinding resistance, is shown.

Figure 1:
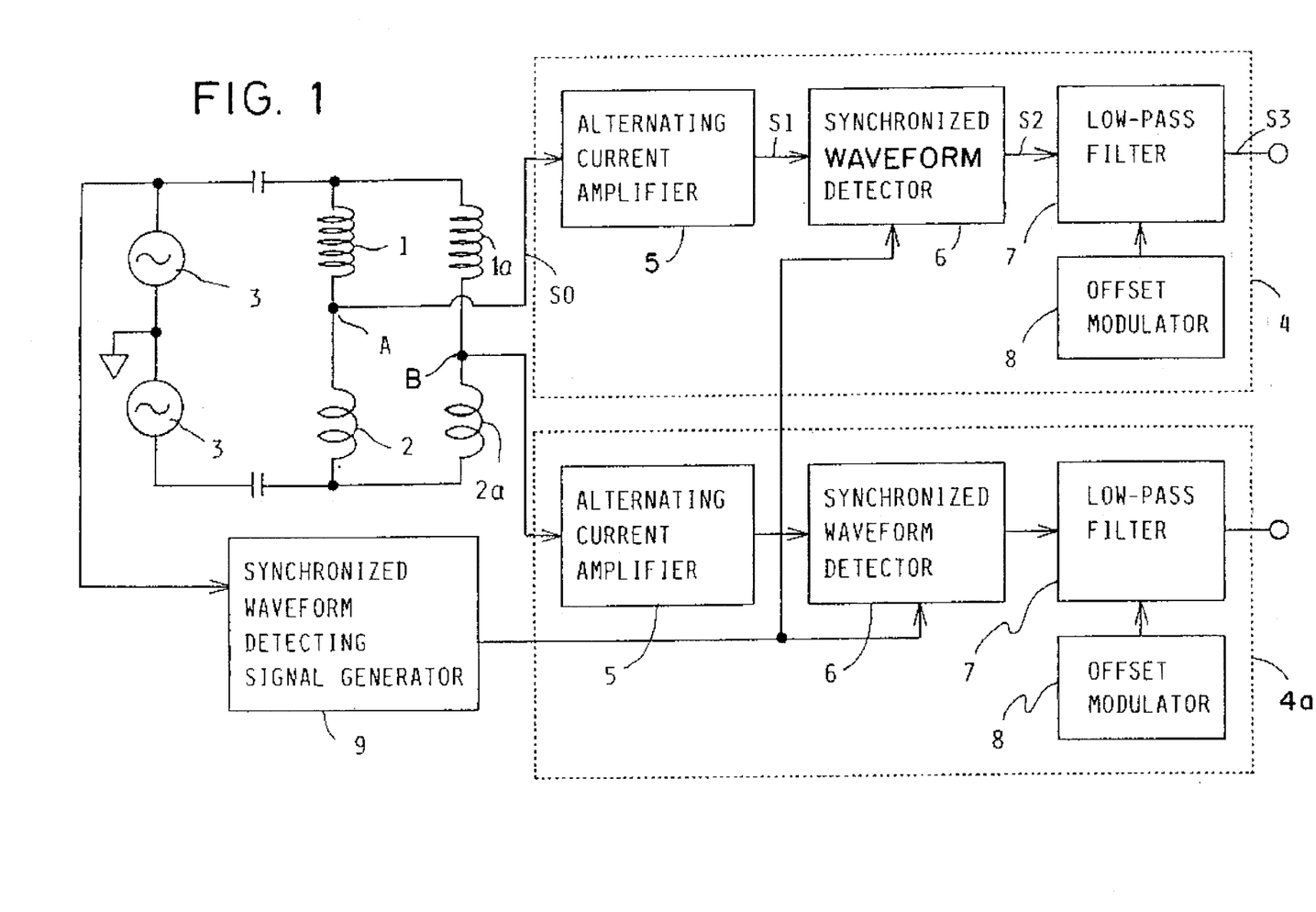
FIG. 1 is a block diagram illustrating a bending magnitude detecting device according to a preferred embodiment of the present invention.
Figure 2:
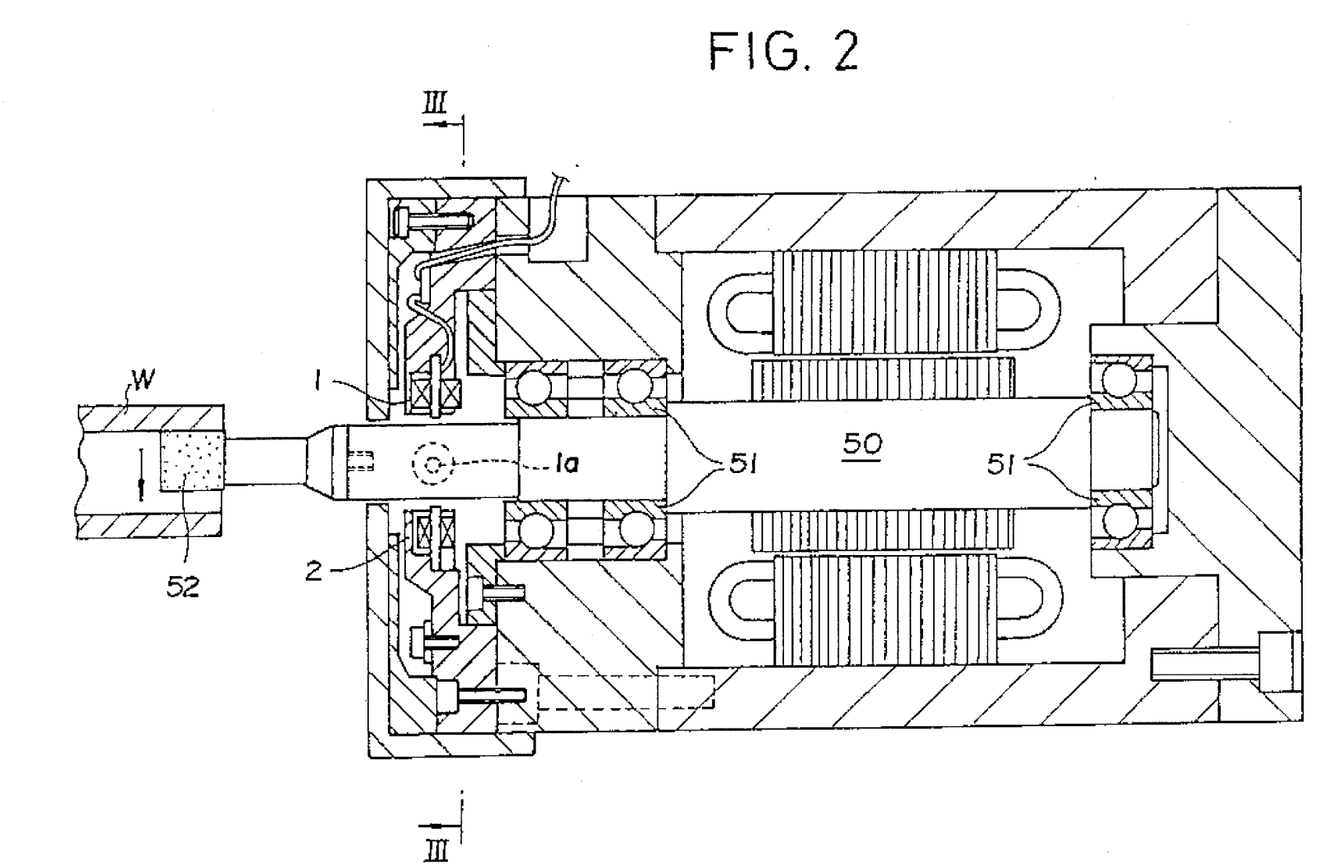
FIG. 2 is a cross-sectional view showing the bending magnitude detecting device shown in FIG. 1 fitted to a grindstone shaft.
Figure 3:
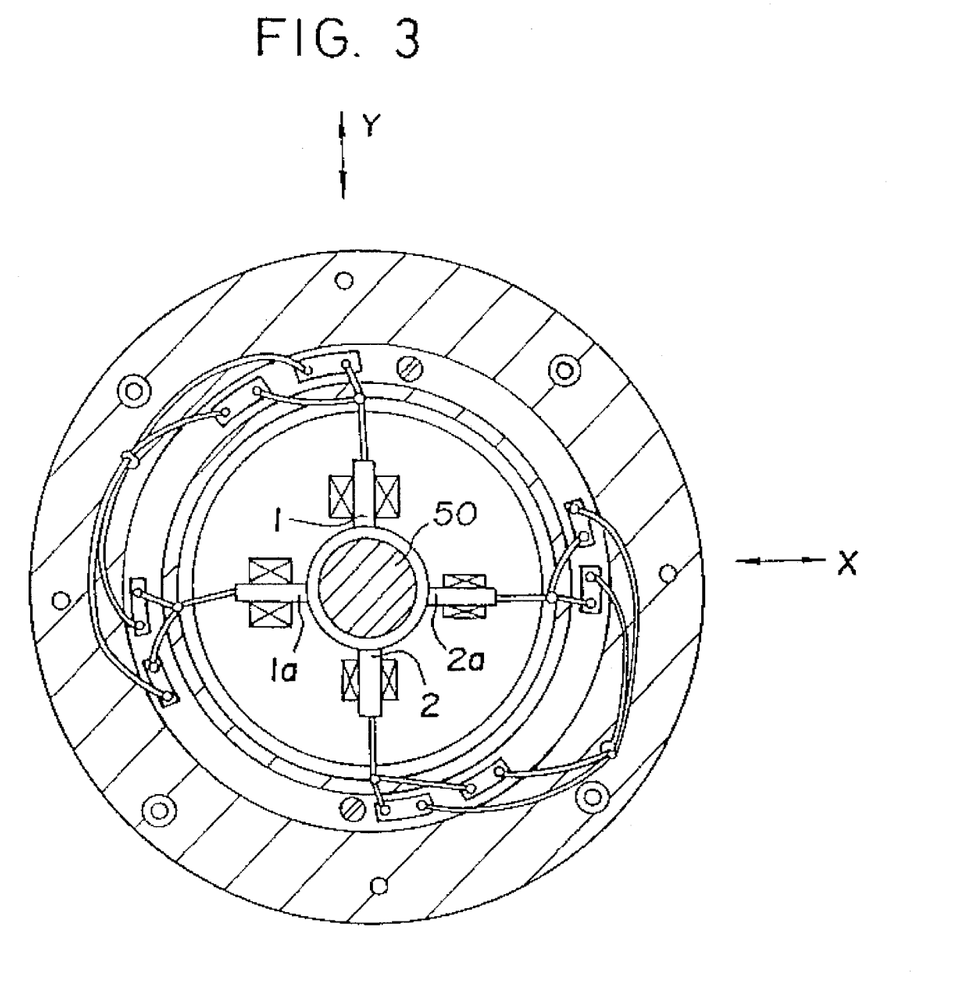
FIG. 3 is a cross-sectional view taken along the line III—III of FIG. 2.

This bending magnitude detecting device, as shown in FIG. 1, has first and second coils 1 and 2. As shown in FIGS. 2 and 3, the first coil 1 is positioned between two sets of bearings 51, which support a shaft 50, and a grindstone 52 mounted on the end of the shaft 50, and also is mounted close to the outer surface of the shaft 50. The second coil 2 is disposed facing the first coil 1 through the shaft 50, and these first and second coils 1 and 2 are connected to each other in series, as shown in FIG. 1.

The number of windings of the first coil 1 is set to be greater than that of the second coil 2, and in this way the coils 1 and 2 are given different inductances. The coils 1 and 2 differ only in their numbers of windings, and the materials of which they are made and their distances from the center line of the shaft 50, etc., are made the same.

Figure 5A:
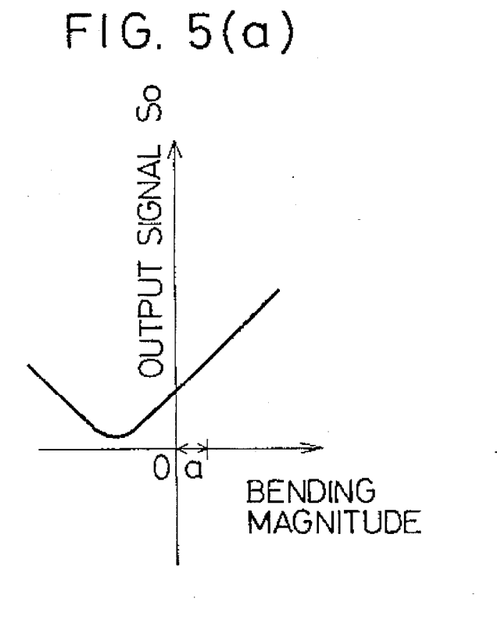
FIGS. 5a and 5b are views illustrating the characteristics of the output signals in a bending magnitude detecting device according to the present invention.

A high frequency voltage from two high frequency oscillators 3, 3 is applied across the coils 1 and 2. When the shaft 50 bends while the high frequency voltage is being applied across the coils 1 and 2, an output signal $S_0$ which has the high frequency component of the high frequency oscillators 3, 3 and whose absolute value corresponds to the bending magnitude of the shaft 50 is obtained from the nodal series connection point A of the two coils 1 and 2. The characteristic of the output signal $S_0$ thus obtained is offset in one direction, as shown in FIG. 5(a), due to the above-mentioned difference between the inductances of the two coils 1 and 2. In other words, the construction is such that even when the range over which the shaft bends is in the vicinity of the center of the two coils 1 and 2 and also the bending magnitude of the shaft 50 is in the extremely small range [a], a constant linearity is obtained in the characteristic of the output signal $S_0$ at all times.

Figure 5B:
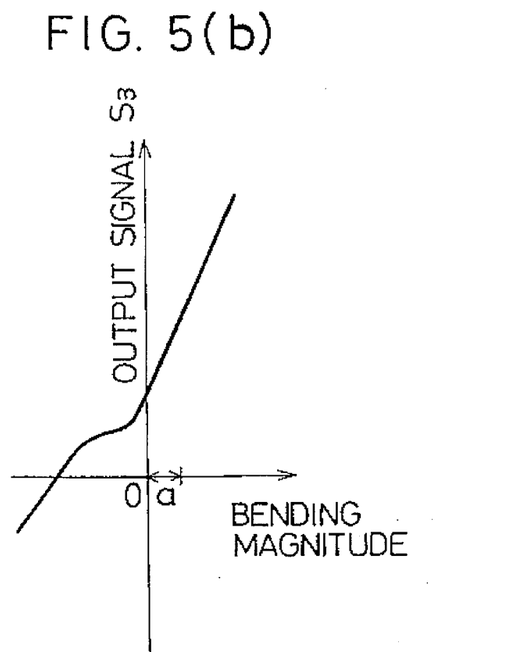

A bending magnitude detecting circuit 4 is connected to the series connection point A of the two coils 1 and 2, and this bending magnitude detecting circuit 4 contains an alternating current amplifier 5, a synchronized waveform detector 6, a low-pass filter 7 and an offset modulator 8. The alternating current amplifier 5 amplifies the output signal $S_0$ from the series connection point A and outputs it to the synchronized waveform detector 6. The synchronized waveform detector 6 wave-detects the amplified output signal $S_1$ from the alternating current amplifier 5 based on a synchronization signal from the synchronized waveform detecting signal generator 9 and outputs it to the low-pass filter 7, and the low-pass filter 7 cuts the high frequency component of the high frequency oscillators 3 from the wave-detected output signal $S_2$. The high frequency-filtered output signal $S_3$ from this low-pass filter 7 also is obtained with its characteristic still offset, as shown in FIG. 5(b). In other words, the construction is such that even when the bending magnitude of the shaft 50 is in the extremely small range [a], a constant linearity is obtained in the high frequency-filtered output signal S, at all times.

The purpose of the offset modulator 8 is to modulate the level of the high frequency-filtered output signal $S_3$. Using this modulating function, when the bending magnitude of the shaft 50 is "0" it is possible to set the value of the high frequency-filtered output signal $S_3$ from the low-pass filter to "0".

It is noted here that the first and second coils 1, 2 and the bending magnitude detecting circuit 4 discussed above detect the bending magnitude of the shaft 50 in the Y-axis direction. The device further comprises first and second coils 1a, 2a having a nodal point B and another bending magnitude detecting circuit 4a to detect the bending magnitude of the shaft 50 in the X-axis direction. Since their construction is the same as that of the components 1, 2 and 4 described above, their detailed description will be omitted.

Now, the operation of a bending magnitude detecting device constructed as described above will be explained in detail, with reference to FIGS. 1 to 3 and FIG. 5.

According to this bending magnitude detecting device, while a high frequency voltage from the high frequency oscillators 3 is applied across the two coils 1 and 2, grinding of a workpiece W with the grindstone 52 is performed. When the shaft 50 is caused to bend by this grinding, an output signal $S_0$ whose absolute value corresponds to the bending magnitude of the shaft 50 is outputted from the series connection point of the two coils 1 and 2 to the bending magnitude detecting circuit 4. The characteristic of this output signal $S_0$ is offset, as shown in FIG. 5(a) due to the difference in the number of windings, that is, the difference in the inductances, of the two coils 1 and 2. As a result, even if the bending magnitude of the shaft 50 is in the extremely small range [a], a constant linearity is obtained in the output signal $S_0$ at all times.

The output signal $S_0$ outputted to the bending magnitude detecting circuit 4 is amplified by the amplifier 5, wave-detected by the synchronized waveform detector 6 based on the synchronization signal from the synchronized wave detection signal generator 9, and then outputted to the low-pass filter 7. In in the low-pass filter 7, the high frequency component of the high frequency oscillator 3 is then cut. The characteristic of this high frequency-filtered output signal $S_3$ is also obtained still in an offset state, as shown in FIG. 5(b). In other words, even when the bending magnitude of the shaft 50 is in the extremely small range [a], a constant linearity is obtained in the high frequency-filtered output signal $S_3$ at all times. Therefore, even when the shaft 50 is bent only very slightly, it is possible to detect that bending magnitude from the high frequency-filtered output signal $S_3$ with high precision.

The offset modulator 8 modulates the level of the high frequency-filtered output signal $S_3$. Using this modulation, when the bending magnitude of the shaft 50 is "0", it is possible to set the value of the high frequency-filtered output signal $S_3$ to "0".

Accordingly, according to the bending magnitude detecting device of the preferred embodiment described above, because there is provided a difference between the number of windings of the first and second coils, that is, because there is provided a difference in the inductances of the two coils, the output signal obtained from the series connection point of the two coils is caused to be offset in one direction. In other words, even when the bending magnitude of the shaft is in the extremely small range, a constant linearity is obtained in the characteristic of the output signal at all times, and it is therefore possible to detect the bending magnitude of the shaft precisely based that output signal.

Because the bending magnitude of the shaft is a few micrometers at the most, if the difference between the inductances of the first and second coils is to some extent set to be large, then a constant linearity can be obtained for bending in the opposite direction also. That is, it is possible to make the output signal have linearity over the range of bending magnitudes to be measured.

Furthermore, according to the bending magnitude detecting device of this preferred embodiment, because it is made possible to detect the bending magnitude of the shaft precisely just by providing a difference in the inductances of the two coils, without mounting an extra target on the shaft, high speed rotation of the shaft also becomes possible.

Figure 4:
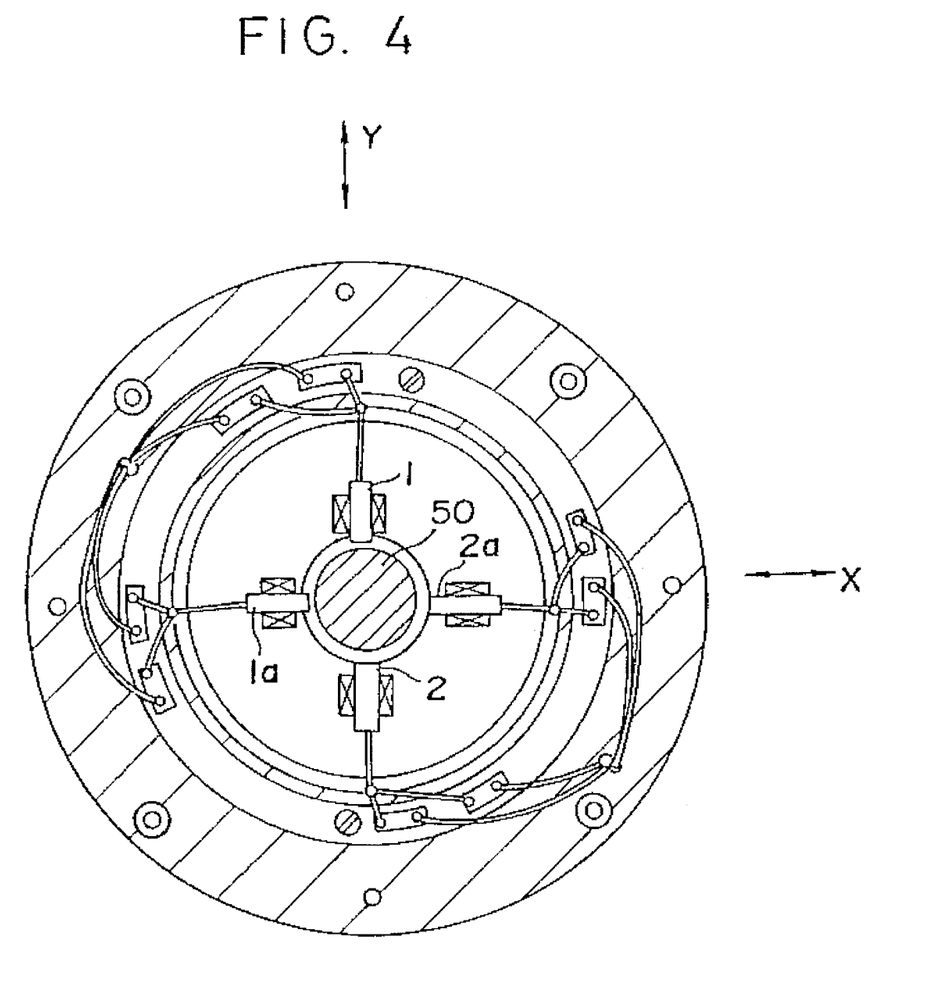
FIG. 4 is a view illustrating a bending magnitude detecting device according to another preferred embodiment of the present invention.

It is noted that although in the preferred embodiment described above the construction was such that, as the means by which the difference between the inductances of the two coils 1 and 2 is provided, a difference was provided in the number of windings of the two coils 1 and 2, the invention is not limited to this construction. For example, the device may be alternatively constructed in such a way that, as shown in FIG. 4, both the coils 1 and 2 have the same number of windings, and just the positions in which the coils 1 and 2 are disposed are made to differ, so that the distance of the first coil 1 from the center line of the shaft 50 is shorter than that of the second coil 2 and the inductance of the first coil is made greater than that of the second coil. Alternatively, the device may be constructed in such a way that just the materials of the iron cores of the coils 1 and 2 are suitably selected to make the inductances of the first and second coils different.

Although in the preferred embodiment described above the invention was described with reference to an example in which it is applied to a grindstone shaft, the invention is not limited to this, and can alternatively be applied to the main shaft of the workpiece side, or the like.

In a bending magnitude detecting device according to this invention, because, as described above, a difference is provided between the inductances of the first and second coils, the output signal obtained from the series connection point of the two coils is offset in one direction. Therefore, even when the bending magnitude of the shaft is in the extremely small range, a constant linearity can be obtained in the characteristic of this output signal, and based on this signal it is possible to detect the bending magnitude of the shaft with high precision.

Furthermore, according to this bending magnitude detecting device, because highly precise detection of the bending magnitude of the shaft is made possible just by the provision of a difference in the inductances of the two coils, without an extra target being mounted on the shaft, the device has advantages such as that high speed rotation of the shaft also becomes possible.

What is claimed is:

1. A device for detecting a bending magnitude of a shaft, the device comprising: at least one first coil spaced from and facing the outer surface of a shaft and having an inductance value; at least one second coil spaced from and facing the outer surface of the shaft and connected in series to the first coil at a nodal point, the second coil having an inductance value different from the inductance value of the first coil, the first coil being spaced a first distance from the shaft and the second coil being spaced a second distance from the shaft different from said first distance, the difference between the first and second distances establishing the difference in inductance values between the first and second coils; oscillator means for applying a high frequency voltage across the first and second coils to generate at the nodal point an output signal corresponding to a bending magnitude of the shaft, the output signal having a constant linearity characteristic resulting from the difference in inductance values between the first and second coils; and bending magnitude detection means for detecting a bending magnitude of the shaft based on the output signal from the nodal point of the first and second coils.

2. A device according to claim 1; wherein the oscillator means comprises two high frequency oscillators for applying a high frequency voltage across the first and second coils.

3. A device for detecting a bending magnitude of a shaft, the device comprising: at least one first coil spaced from and facing the outer surface of a shaft and having an inductance value; at least one second coil spaced from and facing the outer surface of the shaft and connected in series to the first coil at a nodal point, the second coil having an inductance value different from the inductance value of the first coil; oscillator means for applying a high frequency voltage across the first and second coils to generate at the nodal point an output signal corresponding to a bending magnitude of the shaft, the output signal having a constant linearity characteristic resulting from the difference in inductance values between the first and second coils; and bending magnitude detection means for detecting a bending magnitude of the shaft based on the output signal from the nodal point of the first and second coils; wherein the first coil comprises a core formed from a first material and the second coil comprises a core formed from a second material different from said first material, the difference in the first and second core materials establishing the difference in inductance values between the first and second coils.

4. A device according to claim 3; wherein the oscillator means comprises two high frequency oscillators for applying a high frequency voltage across the first and second coils.

5. A device for detecting a bending magnitude of a shaft, the device comprising: at least one first coil spaced from and facing the outer surface of a shaft and having an inductance value; at least one second coil spaced from and facing the outer surface of the shaft and connected in series to the first coil at a nodal point, the second coil having an inductance value different from the inductance value of the first coil; oscillator means for applying a high frequency voltage across the first and second coils to generate at the nodal point an output signal corresponding to a bending magnitude of the shaft, the output signal having a constant linearity characteristic resulting from the difference in inductance values between the first and second coils; and bending magnitude detection means for detecting a bending magnitude of the shaft based on the output signal from the nodal point of the first and second coils, the bending magnitude detection means comprising amplifying means for amplifying the output signal from the nodal point of the first and second coils, generating means for generating a synchronization signal, detecting means for detecting the amplified output signal based on the synchronization signal, filter means connected to the detecting means for cutting a high frequency component from the output signal detected by the detecting means and producing an output signal having a constant linearity characteristic, and modulating means for modulating the output signal produced by the filter means.

6. A device according to claim 5; wherein the first coil has a first number of windings and the second coil has a second number of windings different from said first number of windings, the difference between the first and second number of windings establishing the difference in inductance values between the first and second coils.

7. A device according to claim 5; wherein the oscillator means comprises two high frequency oscillators for applying a high frequency voltage across the first and second coils.

8. In a grinding apparatus: a shaft mounted for rotation about its longitudinal axis; a first pair of coils spaced from and facing the outer surface of a shaft and having an inductance value; a second pair of coils spaced from and facing the outer surface of the shaft, each coil of the second pair being connected in series to a respective one of the coils of the first pair at respective nodal points, the second pair of coils having an inductance value different from the inductance value of the first pair of coils; a pair of oscillators for applying a high frequency voltage across the first and second pairs of coils to generate at each of the nodal points an output signal corresponding to a bending magnitude of the shaft, each output signal having a constant linearity characteristic resulting from the difference in inductance values between the first and second pairs of coils; an amplifier connected to each of the nodal points for amplifying the output signal from the nodal point; a synchronizing signal generator for generating a synchronization signal; a synchronizing detector connected to each of the amplifiers for detecting the amplified output signal from the amplifier based on the synchronization signal; a low-pass filter connected to each of the synchronizing detectors for cutting a high frequency component from the output signal detected by the synchronizing detector and producing an output signal having said constant linearity characteristic; and modulating means connected to each of the low-pass filters for modulating the output signal produced by the low-pass filter.

9. A device according to claim 8; wherein the first pair of coils has a first number of windings and the second pair of coils has a second number of windings different from said first number of windings, the difference between the first and second number of windings establishing the difference in inductance values between the first and second pairs of coils.

10. A device for detecting a bending magnitude of a shaft, the device comprising: a first pair of coils spaced a first distance from and facing the outer surface of a shaft and having an inductance value; a second pair of coils spaced a second distance from the shaft different from the first distance and facing the outer surface of the shaft, each coil of the second pair being connected in series to a respective one of the coils of the first pair at respective nodal points, the second pair of coils having an inductance value different from the inductance value of the first pair of coils, the difference between the first and second distances establishing the difference in inductance values between the first and second pairs of coils; a pair of oscillators for applying a high frequency voltage across the first and second pairs of coils to generate at each of the nodal points an output signal corresponding to a bending magnitude of the shaft, each output signal having a constant linearity characteristic resulting from the difference in inductance values between the first and second pairs of coils; an amplifier connected to each of the nodal points for amplifying the output signal from the nodal point; a synchronizing signal generator for generating a synchronization signal; a synchronizing detector connected to each of the amplifiers for detecting the amplified output signal from the amplifier based on the synchronization signal; and a low-pass filter connected to each of the synchronizing detectors for cutting a high frequency component from the output signal detected by the synchronizing detector and producing an output signal having said constant linearity characteristic.

11. A device for detecting a bending magnitude of a shaft, the device comprising: a first pair of coils comprised of a core formed from a first material and being spaced from and facing the outer surface of a shaft and having an inductance value; a second pair of coils comprised of a core formed from a second material different from the first material of the first pair of coils, the second pair of coils being spaced from and facing the outer surface of the shaft, each coil of the second pair being connected in series to a respective one of the coils of the first pair at respective nodal points, the second pair of coils having an inductance value different from the inductance value of the first pair of coils, the difference in the first and second core materials establishing the difference in inductance values between the first and second pair of coils; a pair of oscillators for applying a high frequency voltage across the first and second pairs of coils to generate at each of the nodal points an output signal corresponding to a bending magnitude of the shaft, each output signal having a constant linearity characteristic resulting from the difference in inductance values between the first and second pairs of coils; an amplifier connected to each of the nodal points for amplifying the output signal from the nodal point; a synchronizing signal generator for generating a synchronization signal; a synchronizing detector connected to each of the amplifiers for detecting the amplified output signal from the amplifier based on the synchronization signal; and a low-pass filter connected to each of the synchronizing detectors for cutting a high frequency component from the output signal detected by the synchronizing detector and producing an output signal having said constant linearity characteristic.

12. A device for detecting a bending magnitude of a shaft, the device comprising: a first pair of coils spaced from and facing the outer surface of a shaft and having an inductance value; a second pair of coils spaced from and facing the outer surface of the shaft, each coil of the second pair being connected in series to a respective one of the coils of the first pair at respective nodal points, the second pair of coils having an inductance value different from the inductance value of the first pair of coils; a pair of oscillators for applying a high frequency voltage across the first and second pairs of coils to generate at each of the nodal points an output signal corresponding to a bending magnitude of the shaft, each output signal having a constant linearity characteristic resulting from the difference in inductance values between the first and second pairs of coils; an amplifier connected to each of the nodal points for amplifying the output signal from the nodal point; a synchronizing signal generator for generating a synchronization signal; a synchronizing detector connected to each of the amplifiers for detecting the amplified output signal from the amplifier based on the synchronization signal; a low-pass filter connected to each of the synchronizing detectors for cutting a high frequency component from the output signal detected by the synchronizing detector and producing an output signal having said constant linearity characteristic; and modulating means connected to each of the low-pass filters for modulating the output signal produced by each low-pass filter.

13. In a grinding apparatus: a shaft mounted for rotation about its longitudinal axis; a first pair of coils spaced a first distance from and facing the outer surface of a shaft and having an inductance value; a second pair of coils spaced a second distance from the shaft different from the first distance and facing the outer surface of the shaft, each coil of the second pair being connected in series to a respective one of the coils of the first pair at respective nodal points, the second pair of coils having an inductance value different from the inductance value of the first pair of coils, the difference between the first and second distances establishing the difference in inductance values between the first and second pairs of coils; a pair of oscillators for applying a high frequency voltage across the first and second pairs of coils to generate at each of the nodal points an output signal corresponding to a bending magnitude of the shaft, each output signal having a constant linearity characteristic resulting from the difference in inductance values between the first and second pairs of coils; an amplifier connected to each of the nodal points for amplifying the output signal from the nodal point; a synchronizing signal generator for generating a synchronization signal; a synchronizing detector connected to each of the amplifiers for detecting the amplified output signal from the amplifier based on the synchronization signal; and a low-pass filter connected to each of the synchronizing detectors for cutting a high frequency component from the output signal detected by the synchronizing detector and producing an output signal having said constant linearity characteristic.

14. In a grinding apparatus: a shaft mounted for rotation about its longitudinal axis; a first pair of coils comprised of a core formed from a first material and being spaced from and facing the outer surface of a shaft and having an inductance value; a second pair of coils comprised of a core formed from a second material different from the first material, the second pair of coils being spaced from and facing the outer surface of the shaft, each coil of the second pair being connected in series to a respective one of the coils of the first pair at respective nodal points, the second pair of coils having an inductance value different from the inductance value of the first pair of coils, the difference in the first and second core materials establishing the difference in inductance values between the first and second pair of coils; a pair of oscillators for applying a high frequency voltage across the first and second pairs of coils to generate at each of the nodal points an output signal corresponding to a bending magnitude of the shaft, each output signal having a constant linearity characteristic resulting from the difference in inductance values between the first and second pairs of coils; an amplifier connected to each of the nodal points for amplifying the output signal from the nodal point; a synchronizing signal generator for generating a synchronization signal; a synchronizing detector connected to each of the amplifiers for detecting the amplified output signal from the amplifier based on the synchronization signal; and a low-pass filter connected to each of the synchronizing detectors for cutting a high frequency component from the output signal detected by the synchronizing detector and producing an output signal having said constant linearity characteristic.

15. In a grinding apparatus: a shaft mounted for rotation about its longitudinal axis; at least one first coil spaced a first distance from and facing the outer surface of a shaft and having an inductance value; at least one second coil spaced a second distance from the shaft different from the first distance and facing the outer surface of the shaft and connected in series to the first coil at a nodal point, the second coil having an inductance value different from the inductance value of the first coil, the difference between the first and second distances establishing the difference in inductance values between the first and second coils; oscillator means for applying a high frequency voltage across the first and second coils to generate at the nodal point an output signal corresponding to a bending magnitude of the shaft, the output signal having a constant linearity characteristic resulting from the difference in inductance values between the first and second coils; and bending magnitude detection means for detecting a bending magnitude of the shaft based on the output signal from the nodal point of the first and second coils.

16. In a grinding apparatus: a shaft mounted for rotation about its longitudinal axis; at least one first coil comprised of a core formed from a first material and being spaced from and facing the outer surface of a shaft and having an inductance value; at least one second coil comprised of a core formed from a second material different from the first material, the second coil being spaced from and facing the outer surface of the shaft and connected in series to the first coil at a nodal point, the second coil having an inductance value different from the inductance value of the first coil, the difference in the first and second core materials establishing the difference in inductance values between the first and second coils; oscillator means for applying a high frequency voltage across the first and second coils to generate at the nodal point an output signal corresponding to a bending magnitude of the shaft, the output signal having a constant linearity characteristic resulting from the difference in inductance values between the first and second coils; and bending magnitude detection means for detecting a bending magnitude of the shaft based on the output signal from the nodal point of the first and second coils.

\* \* \* \* \*